Figure 1:
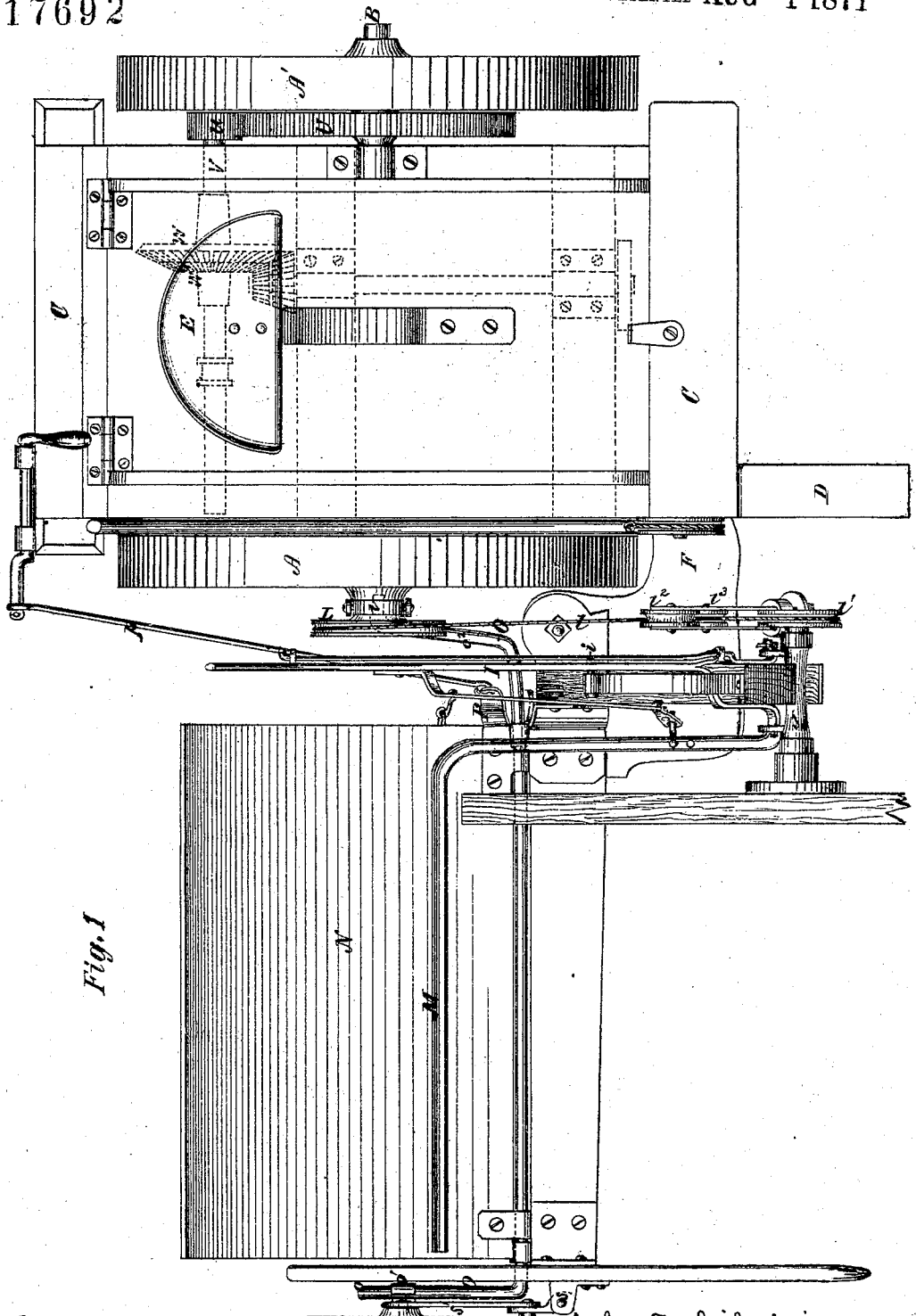

John F. Seiberling, Harvester.

3 Sheets. Sheet 2.

No. 117692

Witnesses:—
W. H. Rowe,
Joe S. Peyton.

John F. Seiberling
by his Atty.
W. D. Baldwin

John F. Seiberling, Harvester.

No. 117692

3 Sheets, Sheet 3

Witnesses:
W. H. Rowe,
Joel Peyton.

UNITED STATES PATENT OFFICE.

JOHN F. SEIBERLING, OF AKRON, OHIO.

IMPROVEMENT IN HARVESTERS.

Specification forming part of Letters Patent No. 117,692, dated August 1, 1871.

*To all whom it may concern:*

Be it known that I, JOHN F. SEIBERLING, of Akron, in the county of Summit and State of Ohio, have invented certain new and useful Improvements in Harvesters, of which the following is a specification:

The first part of my invention relates to the reel. Its object is to enable the driver of the machine, at will, to raise or lower the reel to pick up fallen, lodged, or short grain, or to cut tall upright grain to the best advantage; and the improvement consists: First, in so mounting the reel-shaft in bearings in a lever controlled by the driver and pivoted in rear of the reel-post that the shaft is close to the reel-post, and is likewise supported against horizontal or lateral strains. Second, in combining a reel-post, a reel-shaft mounted in bearings in a lever fulcrumed on the reel-post, and a guide to sustain and brace the reel against vertical strains. The object of the next part of my invention is to preserve the tension of the reel-driving belt during the up-and-down movements of the reel; to which end the improvement consists, third, in combining a reel-post, a reel-shaft mounted upon a lever fulcrumed on the reel-post, tension-pulleys moving up and down with the reel-shaft, and a driving-belt or band for driving the reel. The next part of my invention relates to that class of harvesters in which a cut-off is interposed between the platform and the grain that is cut and falling during the discharge of the gavel; and the improvement consists, fourth, in combining a reel capable of being raised and lowered by the driver with a cut-off rising and falling in conformity with the movements of the reel to preserve the proper relation between the two. The next part of my invention relates to that class of harvesters known as droppers. Its object is to preserve the proper relation between the platform, the cut-off, and the adjustable reel; and the improvement consists, fifth, in combining a reel mounted on a lever capable of being raised or lowered by the driver, a cut-off moving with the reel and pivoted to the lever by link-connections, a dropping or tilting-platform linked to the cut-off, and tilting mechanism operated by the driver. The next part of my invention relates to the devices for raising and lowering the grain end of the platform; and the improvement consists, sixth, in combining with the grain-wheel a rocking-shaft cranked at each end, one end controlling the grain-wheel and the other pivoted to an arm swiveled on the main axle, to compensate the vertical oscillations of the finger-beam. Seventh, my invention further consists in combining a grain-wheel, capable of moving horizontally around the pivot of its arm when mowing, with a crank-arm to lock and hold it when reaping. The object of the next part of my invention is to vary the speed of the cutters; to which end my improvement consists, eighth, in combining two bevel-pinions on the crank-shaft with two concentric bevel-gears turning loosely and independently on the countershaft and a locking-pin on the countershaft, which pin alternately is thrown into gear with one or the other of the gears, to vary the speed, by sliding the countershaft endwise in its bearings.

The accompanying drawing shows all the improvements hereinbefore referred to as embodied in the well-known "Excelsior" harvester heretofore patented by me. Obviously, however, some of my improvements may be used without the others and on machines differing in construction from that herein described.

Figure 2:
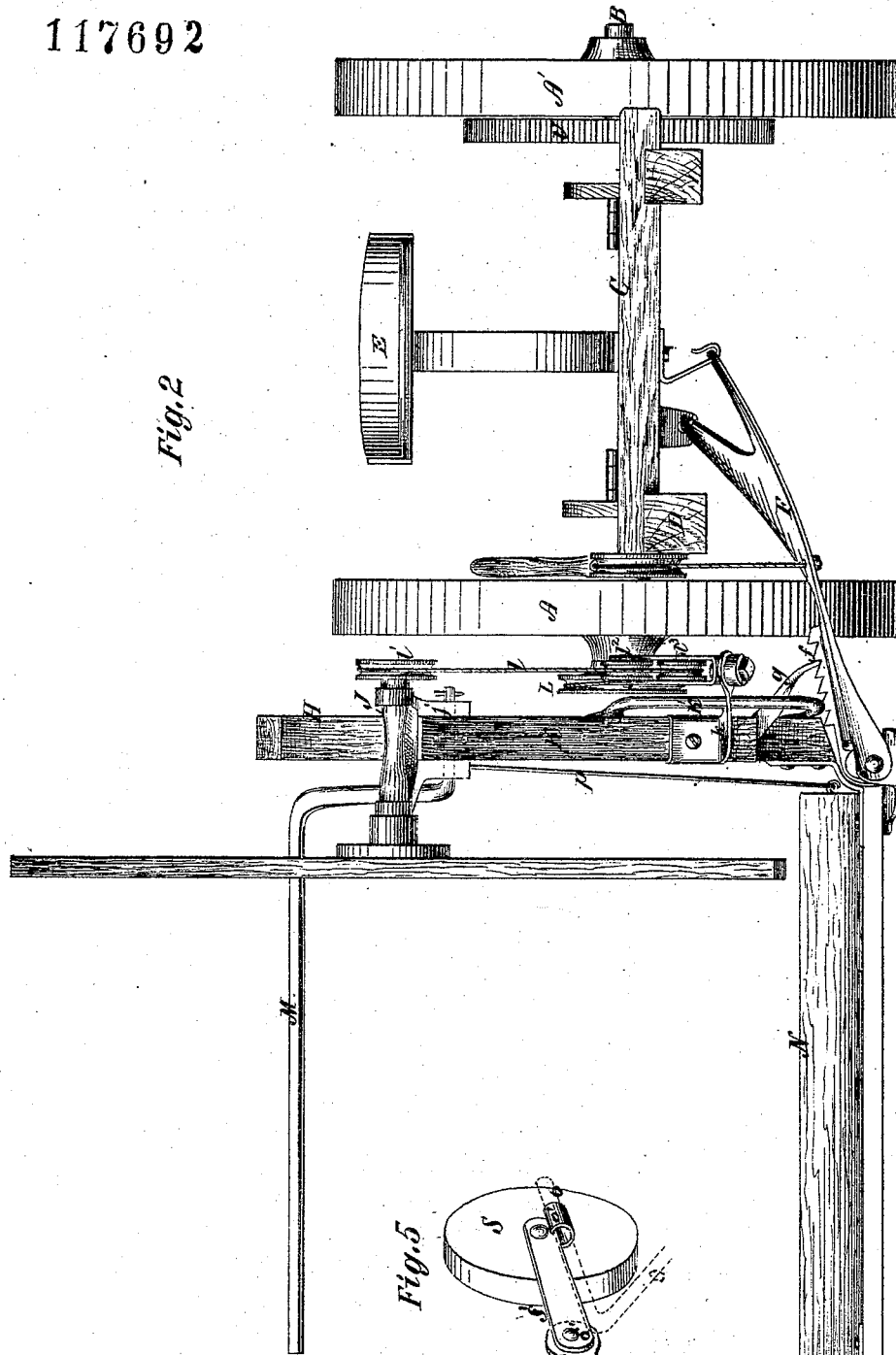
Figure 5:
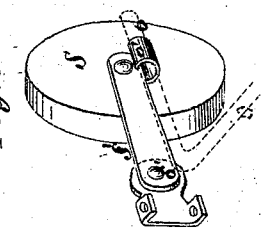
Figure 4:
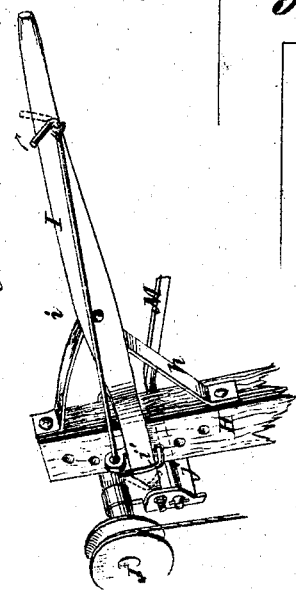
Figure 5:
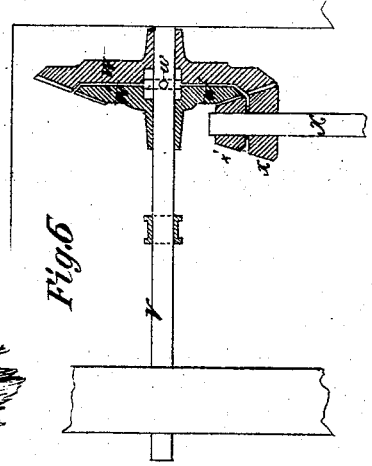
Figure 3:
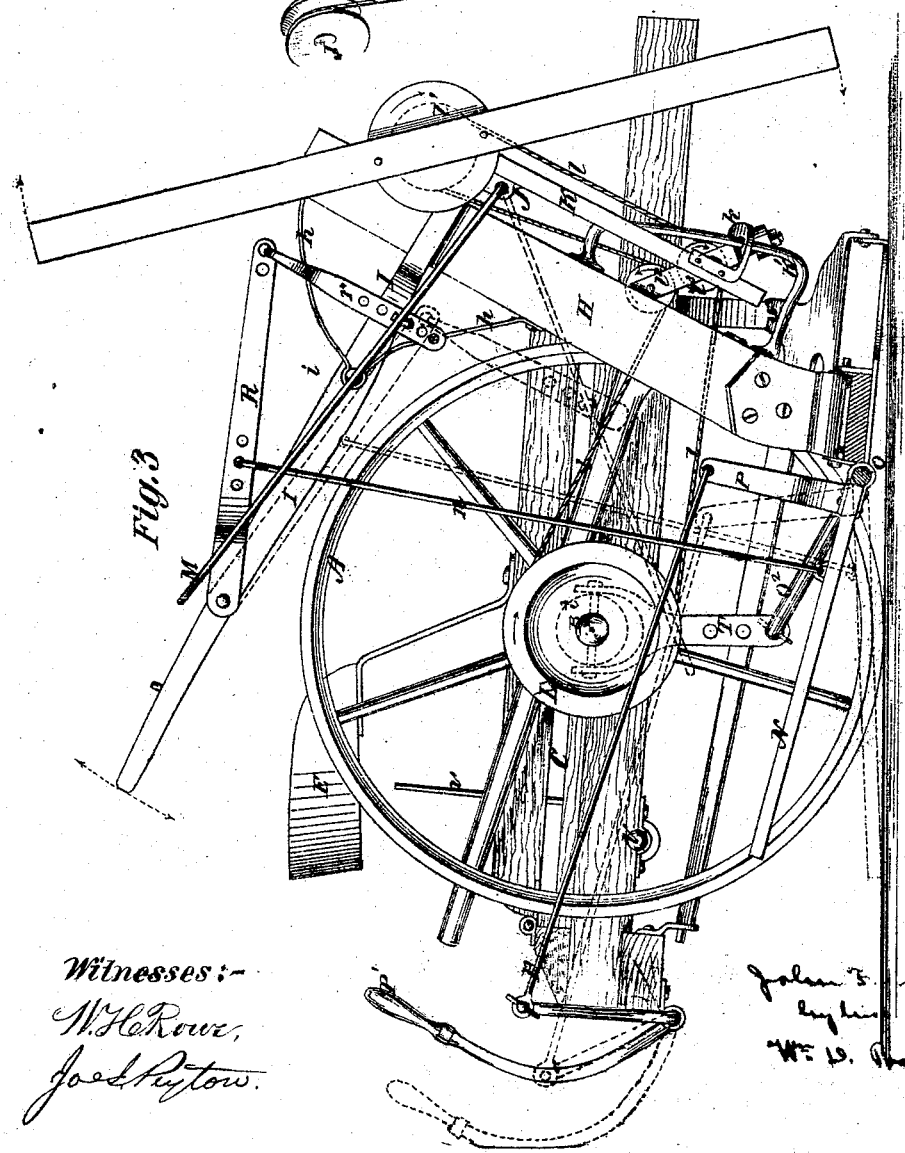

Figure 1 represents a plan or top view of so much of my improved machine as is necessary to illustrate the invention claimed; Fig. 2, a front elevation thereof; Fig. 3, a side elevation thereof; Fig. 4, a perspective view of the reel, reel-post, and lever detached; Fig. 5, a perspective view of the grain-wheel and its connections; Fig. 6, a sectional view of the gearing detached.

In this instance two main wheels, A A', are shown as mounted on a main axle, B, with which they may be connected by backing-ratchets, as usual. The main axle turns in suitable bearings in a main frame, C, from which a tongue, D, projects. A seat, E, for the driver is mounted on the frame. A coupling-frame, F, is pivoted at one end to the main frame and at the other to a finger-beam, G. A reel-post, H, is mounted on the heel end of the finger-beam or on its shoe. A pawl, *g*, on the finger-beam takes into a rack, *f*, on the coupling-frame to lock the joint of the finger-beam when reaping. A lever, I, rocks vertically on a pivot, *i*, in a bracket, *h*, secured to and projecting back of the reel-post. This lever extends backward in easy reach of the driver when on his seat, is forked to embrace the reel-post, and carries on its front end a bracket, *j*, in which the shaft J of the reel is mounted. A detent, $i'$, on the lever, takes into one of a series of notches on the reel-post, to hold it at any desired elevation. A guide-arm, K, secured to the reel-bracket $j$, carries on its lower end a lug, $k$. A guide, K', secured to the reel-post, passes through a hole in this lug, which moves freely up and down on the guide, but its lateral movements are restrained by it. It will be noticed that by the mode of construction above described the forks of the lever resist lateral strain on the reel-bearings, while the guide-arm K supports the reel against vertical strains. The reel-shaft, moreover, is brought close to the post, and yet moves freely up and down, without friction, against the post, while, by pivoting the lever on the bracket behind the post, a wider range of motion is secured for the reel. A band or cord, $l$, encircles a pulley, L, on the main axle, a corresponding pulley, $l^1$, on the reel-shaft, and passes around tension-pulleys $l^2$ $l^3$ secured on the lug $k$ of the guide-arm. As this lug moves correspondently with the reel, the tension of the reel-belt is always maintained. A cut-off, M, is pivoted to the bracket J, so that it may swing around the reel in the usual way as well as rise and fall with it. A platform, N, is pivoted to the finger-beam by means of a rock-shaft, O, passing through eyes on the back of the finger-beam and the front of the platform. The platform is oscillated by means of an arm, P, connected by a link, $p$, pivoted to a double-cranked rocking-lever, P', pivoted on the main frame and operated by the driver. In droppers of this class the cut-off must be interposed between the platform and reel while the gavel is being discharged, and removed out of the way while the gavel is falling on the platform, which movements are generally made by means of a link-connection between the cut-off and platform. As in this instance the cut-off moves up and down with the reel, and its relation to the platform is therefore frequently varied, some adjustment in the link-connection between the platform and cut-off is essential. Instead, therefore, of connecting the platform directly with the cut-off, as heretofore has been the practice, I pivot the cut-off to a link, $r$, in turn pin-jointed to an arm, R, pivoted to the lever I. This arm is connected with the platform by a link-rod, $n$. These connections are all adjustable to set the cut-off and platform in proper relation to each other, and their operation is such as to maintain the cut-off in substantially the same relation to the reel and platform, notwithstanding the upward and downward movement of the reel. The grain-wheel S is mounted on an arm, S', which swings horizontally on its pivot $s$, as shown in my former patents. In my machine the finger-beam is folded to the frame by detaching one of the coupling-pins connecting the frame and finger-beam and allowing the latter to swing back horizontally parallel with the driving-wheels. The swinging of the grain-wheel, as above mentioned, accommodates this movement by keeping its face parallel with the driving-wheels. In reaping, this movement is not required, the joint being then rigid, but the arm of the grain-wheel is provided with a joint, $s'$, which allows the arm to flex vertically in order that the finger-beam may be set higher or lower. To prevent the lateral movement of the grain-wheel while reaping, a crank, $o$, is formed on the outer end of the rock-shaft O, which crank slips into a socket, $o^1$, on the arm S of the grain-wheel. The finger-beam can thus be raised by bearing on the crank-arm, while the lateral movement of the grain-wheel is prevented. The inner end of the rock-shaft O is cranked like the outer one, its crank-arm $o^2$ being pivoted in one of a series of holes in a link, T, pin-jointed to a collar, $t$, turning loosely on the main axle, thus forming a gimbal-joint. The finger-beam is raised and lowered by well-known means shown in the drawing. The play of the link T around the axle enables the rock-shaft O to accommodate itself to the rising-and-falling movements of the finger-beam without cramping or straining, and by attaching this link to the axle a shorter and more direct connection with the machine is secured and the working of other parts of the mechanism is left undisturbed. A spur-wheel, U, on the main axle drives a corresponding pinion, $u$, on a countershaft, V, which slides freely endwise in its bearings, when moved by a shipping-lever, $v$, of well-known construction. A bevel-wheel, W, turns loosely on its countershaft, as does a similar one, W', the two being concentric with but independent of each other, and having a space between them in which a pin, $w$, on the countershaft slides, alternately engaging with either wheel to vary the speed of the cutters. Each bevel-wheel engages with a corresponding gear, $x$ $x'$, on a crank-shaft, X, which drives the cutters in the usual way. These bevel-wheels work against bearings on the frame, which support them against the strain of working and prevent them from moving with the countershaft and thus being thrown out of gear. The operation of the machine will readily be understood from the foregoing description.

I do not broadly claim changing the speed of the cutters of a harvester or every mode of raising or lowering a reel, these results heretofore having been attained by others.

I claim as my invention—

1. The combination of the single reel-post, the lever pivoted behind the post in a bracket projecting from the post, and the bearing for the reel-shaft mounted on the lever in front of the post, all these members being constructed and operating substantially as hereinbefore set forth.

2. The combination of the reel-post, the lever pivoted to the bracket on the post, the reel-shaft mounted on the lever in front of the post, the guide-arm secured to the bearings of the reel-shaft, and the guide mounted on the lower end of the reel-post, all these members being constructed and operating substantially as hereinbefore set forth.

3. The combination of the reel-post, the lever pivoted to the bracket on the post, the reel-shaft mounted on the lever in front of the post, the guide-arm secured to the bearings of the reel-shaft, the guide mounted on the lower end of the reel-post, the tension-pulleys on the guide-arm, and the driving-belt, all these members being constructed and operating substantially as hereinbefore set forth.

4. The combination of the reel-post, the lever pivoted thereon, the reel mounted on the lever, and the cut-off mounted on the reel-bearings, all these members being constructed and operating substantially as hereinbefore set forth.

5. The combination of the lever, the reel mounted thereon, the cut-off pivoted to the reel-bearing, the pivoted arm of the lever linked to the cut-off, the dropping-platform also linked to the pivoted arm, and the mechanism for tilting the platform, all these members being constructed and operating substantially as hereinbefore set forth.

6. The combination of the grain-wheel and the double-cranked rock-shaft pivoted to the arm on the main axle, all these members being constructed and operating substantially as hereinbefore set forth.

7. The combination of the grain-wheel, its horizontally-swinging arm, the catch on the arm, and the rocking crank-arm fitting therein to lock the grain-wheel when reaping, all these members being constructed and operating as hereinbefore set forth.

8. The combination of the two bevel-pinions on the crank-shaft, the two independent loose bevel-gears, the countershaft sliding endwise through the gears, and the locking-pin on the countershaft, alternately engaging with one or the other of the gears, all these members being constructed, arranged, and operating as set forth.

In testimony whereof I have hereunto subscribed my name.

J. F. SEIBERLING.

Witnesses:
  JOS. I. PEYTON,
  BALTIS DE LONG.